United States Patent [19]

Boyd

[11] Patent Number: 4,558,463
[45] Date of Patent: Dec. 10, 1985

[54] HEM SEAL FOR DRAW TAPE TRASH BAG

[75] Inventor: Dana M. Boyd, Rushville, N.Y.

[73] Assignee: Mobil Oil Corporation, New York, N.Y.

[21] Appl. No.: 636,294

[22] Filed: Jul. 31, 1984

[51] Int. Cl.[4] .............................................. B65D 33/28
[52] U.S. Cl. ..................................... 383/75; 493/225
[58] Field of Search ........................... 383/75; 493/225

[56] References Cited

U.S. PATENT DOCUMENTS

| | | | |
|---|---|---|---|
| 2,777,491 | 1/1957 | Ashton et al. | 383/75 |
| 3,029,853 | 4/1962 | Piazze | 383/75 |
| 3,084,731 | 4/1963 | Kugler | 383/75 |
| 3,414,032 | 12/1968 | Jortikka | 383/75 |
| 3,506,048 | 4/1970 | Jortikka | 383/75 |
| 3,721,383 | 3/1973 | Dufes | 383/75 |
| 3,738,567 | 6/1973 | Ruda | 383/75 |
| 3,738,568 | 6/1973 | Ruda | 383/75 |

FOREIGN PATENT DOCUMENTS 92001 1/1962 Denmark .............................. 383/75

Primary Examiner—Stephen P. Garbe
Attorney, Agent, or Firm—Alexander J. McKillop; Michael G. Gilman; Charles J. Speciale

[57] ABSTRACT

A draw tape trash bag made of linear low density polyethylene film has a tack seal between the folded over hem portion of the top of the bag and the adjacent panel. The tack seal extends in the direction of extrusion across the width of the bag below the draw tape. It includes a continuous line of heat fused polyethylene formed by applying heat, but limited pressure, in an amount just sufficient to weld the polyethylene.

8 Claims, 11 Drawing Figures

U.S. Patent   Dec. 10, 1985   4,558,463
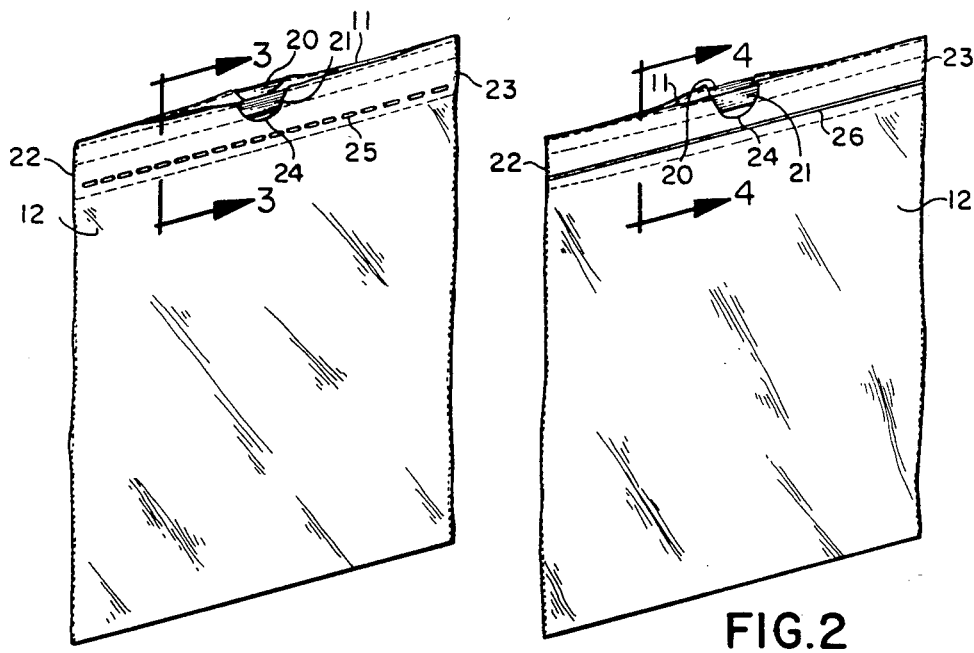
FIG.1
(PRIOR ART)
FIG.2
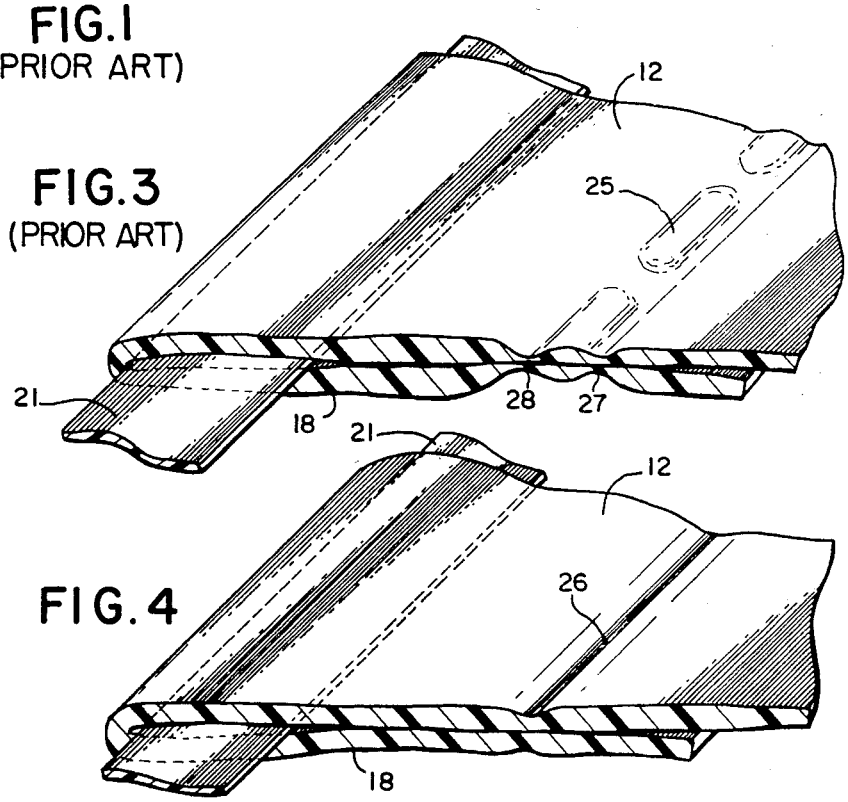
FIG.3
(PRIOR ART)
FIG.4

HEM SEAL FOR DRAW TAPE TRASH BAG

BACKGROUND OF THE INVENTION

This invention relates to plastic draw tape trash bags and more particularly, to an improved hem seal for such a bag.

Bags made of thin polyethylene material have been used in various sizes. Small bags are used in the packaging of sandwiches and the like; larger bags are used as shopping bags and even larger bags are used for containing trash.

A particularly avantageous closure for such a bag includes a draw tape constructed from the same polyethylene material. U.S. Pat. No. 3,029,583—Piazzi, and British Pat. No. 1,125,363—Jortikka are examples of draw tape bags. Such closures have been successfully employed on moderate sized shopping bags. Draw tape closures have not been commercially successful on large trash bags.

The load in a trash bag may typically be as high as 30-50 lbs. With such a large load, the bag will tear at almost any weak point. Tearing is particularly troublesome if there is a weak line in the direction of orientation of the plastic. Bags are typically made from a continuous extruded tube of plastic. This plastic is oriented in the direction of extrusion. Heat seals made perpendicular to the direction of orientation usually present no problems. For example, the edges or sides of the bag are made by a heat seal across the extruded tube, i.e., perpendicular to the direction of orientation.

On the other hand, a heat seal which secures the draw tape in the hem of the bag, extends in the extruded direction across the width of the bag. Because this seal runs in the direction of orientation of the plastic, once a tear is started along a hem seal, it propagates rapidly. In one prior attempt to make a draw tape trash bag, an intermittent seal was used to secure the hem, possibly in an attempt to prevent propagation of tearing along the seal line. Instead of interrupting the tearing, the intermittent seal actually concentrated the stress along the tear line. The shoulders on either side of the intermittent seal were reoriented by the heat and pressure of the seal bar to form strong areas which concentrated the stress in the weak, heat and pressured thinned, area between them. Because of this, a tear, once started, propagated rapidly along the hem seal in this bag.

It is an object of the present invention to provide a draw tape trash bag which will withstand the heavy intended loads without tearing at the hem seal.

RELATED APPLICATION

Application Ser. No. 561,119, filed Dec. 13, 1983, "PROCESS FOR HEAT SEALING THERMOPLASTIC FILM AND APPARATUS THEREFOR", incorporated herein by reference, shows one type of apparatus for forming the seal of the present invention.

SUMMARY OF THE INVENTION

In accordance with the present invention, a draw tape bag for carrying trash and the like has a hem with a tack seal between the hem and the adjacent panel. The tack seal extends in the extruded direction, across the width of the bag below the draw tape. The tack seal includes a continuous line of heat fused polyethylene between the hem portion and the adjacent panel. The seal includes a single groove formed solely by application of moderate heat.

Further in accordance with the present invention, the bag is constructed of linear, low density polyethylene. This material is particularly suitable for forming the tack seal of the present invention. Polyethylene used in the fabrication of bags is typically classified as: high density polyethylene, 0.945 gms/cc to 0.970 gms/cc; and low density polyethylene, 0.910 gms/cc to 0.930 gms/cc. High density polyethylene has been used in the fabrication of shopping bags, but it has not been used in the fabrication of trash bags because it is very susceptible to splitting once it is punctured by a broken bottle, for example. For this reason, low density polyethylene has been used in trash bags. Recently, so called "linear low density polethylene" has been produced by using more butene, or other co-monomer, to drive high density polyethylene down to the range of low density. This linear low density polyethylene is particularly suitable for use in accordance with the present invention, because it has less unrestricted shrinkage in response to the application of heat.

In accordance with the present invention, moderate heat is applied in an amount just sufficient to make the tack seal. Given this moderate amount of heat, the shrinkage on both sides of the heat application is less with linear low density polyethylene. Because of the reduced shrinkage on both sides of the seal, the shrink forces and reorientation of the plastic are significantly less. It has been found that this results in less stress concentration and a lessened propagation of tearing in the bag.

The foregoing and other objects, features and advantages of the invention will be better understood from the following more detailed description and appended claims.

SHORT DESCRIPTION OF THE DRAWINGS

FIG. 1 shows a trash bag with a prior art seal;

FIG. 2 shows a trash bag with the seal of the present invention;

FIG. 3 is a section on the line 3—3 of FIG. 1;

FIG. 4 is a section on the line 4—4 of FIG. 2;

FIG. 8 is a schematic fragmentary side elevational view of the thermoplastic film heat sealing system;

FIG. 9 is a bottom view of the nozzle and flattening plate of the system of FIG. 8;

FIG. 10 is an end elevational view of the system of FIG. 8; and

FIG. 11 is an end elevational view partly fragmented of an alternative heat sealing system.

DESCRIPTION OF THE PREFERRED EMBODIMENT

Figure 7:
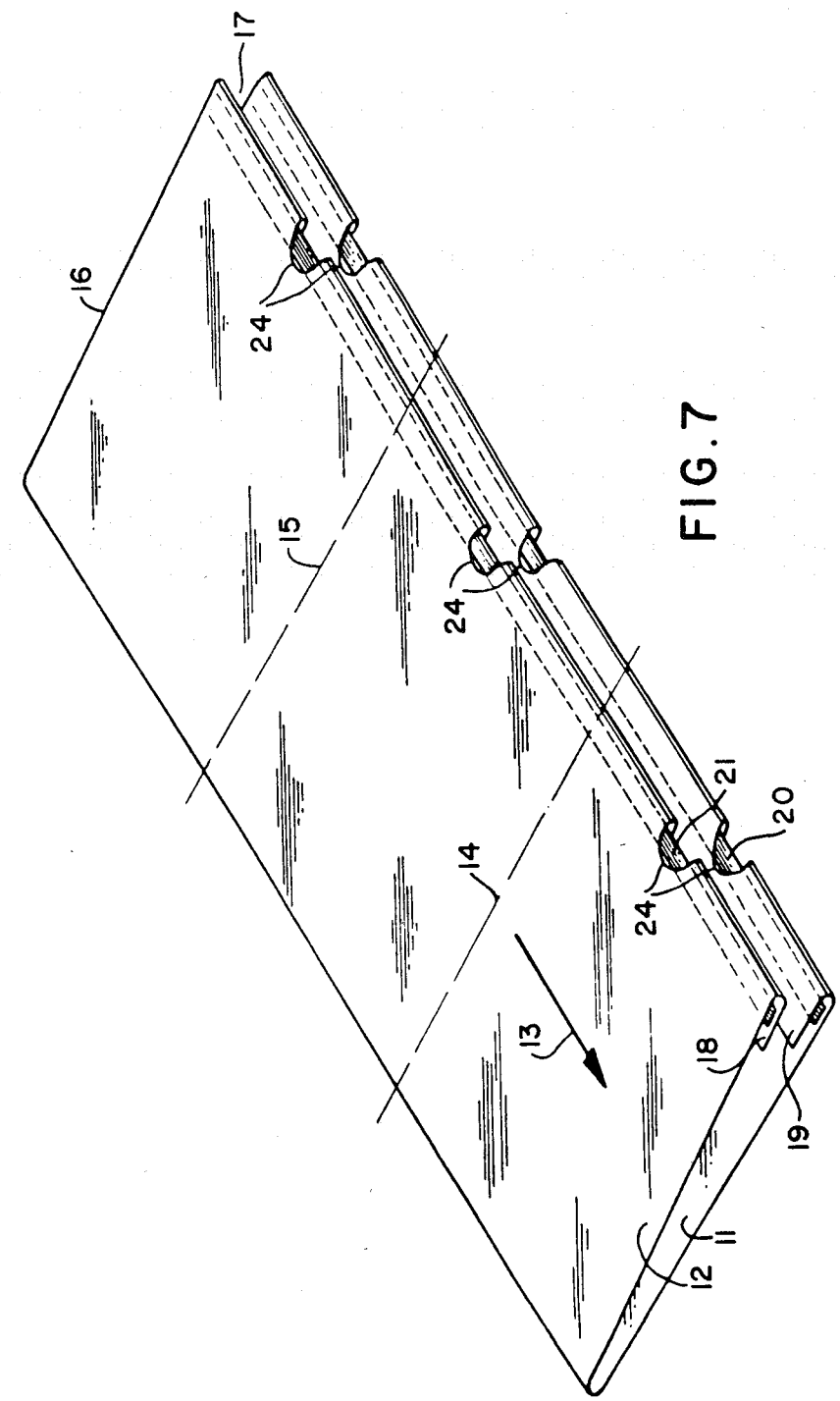
FIG. 7 is a view showing several bags in their relationship during the fabrication process.

Referring to FIGS. 1-4, a draw tape bag for carrying trash includes two panels 11 and 12. As is best shown in FIG. 7, the two panels are formed from a tube of polyethylene which is oriented in the direction of extrusion indicated by the arrow 13. The sides of the panels are heat sealed and cut from the tube at 14, 15 and 16 in a perpendicular direction. The tube is slit along the side 17 to form open tops in the bag for reception of trash and the like. Hem portions 18 and 19 of each panel are folded over adjacent the top. Draw tapes 20 and 21 are secured by the heat seal at the sides of the panels. A cut-out 24 in each panel and hem portion at the middle of the bag, exposes the draw tapes so they can be grasped. When the bag is loaded with trash, the bag is grasped by the draw tape, thereby closing the bag. The draw tapes can thereafter be tied forming a neat bundle.

Figure 5:
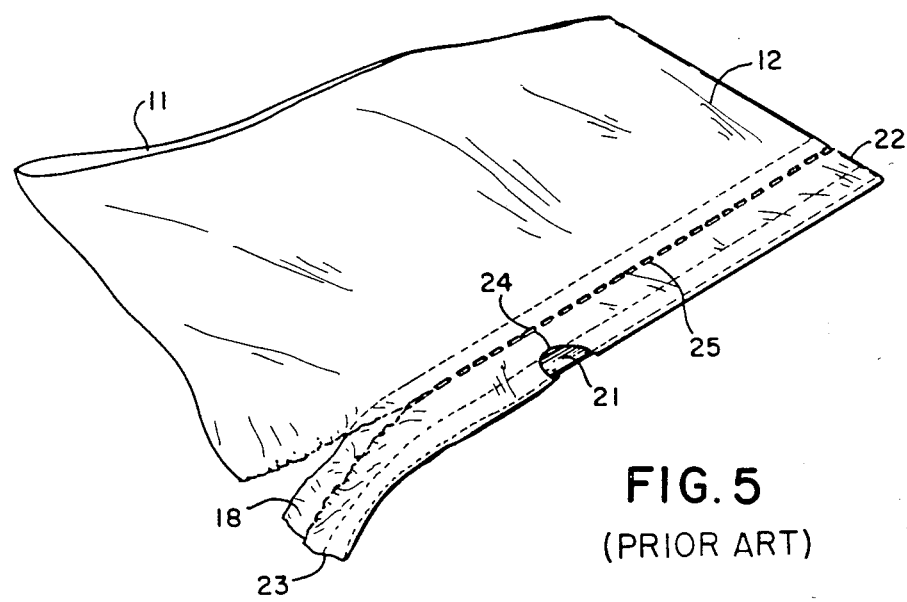
FIG. 5 depicts tearing in the prior art bag.

In order to seal the hem portion to the adjacent panel, thereby seduring the draw tape in the hem, a seal 25 (FIG. 1) extends across the width of the bag below the draw tape. Because this seal extends in the extruded direction, i.e., in the direction of orientation of the polyethylene, it is particularly susceptible to tearing. Such seals are typically made by sealing bars which apply a combination of heat and pressure to adjacent layers of polyethylene which are squeezed between a platen and the seal bar. A typical prior art heat and pressure formed seal is shown in FIG. 3. The particular seal shown in FIG. 3 is an intermittent one, formed by applying heat and pressure at interrupted locations. Polyethylene shrinks upon the application of heat. As a result of application of heat and pressure, the polyethylene shrinks back from the sealing bar forming two thinned portions 27 and 28. The polyethylene at the sides of these thinned portions has been reoriented because of the shrinkage. This reorientation strengthens the plastic at the shoulders of the thinned portion. This results in a concentration of stress in the thinned portion. This stress concentration propagates a tear once it is started as is depicted in FIG. 5. The tear propagates in spite of the interruptions in the thinned portions caused by the intermittent sealing bar. Because the stress is concentrated in the thinned portions, the tear jumps from one thinned portion to another.

Figure 6:
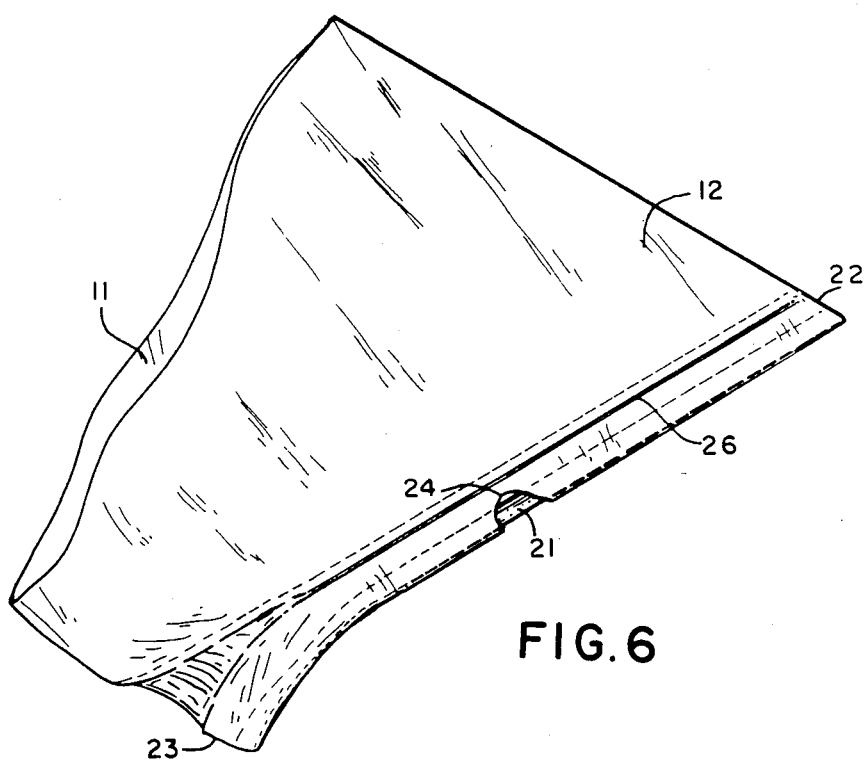
FIG. 6 depicts tearing in the bag with the seal of the present invention.

Greatly improved tearing characteristics were obtained in a bag with the same dimensions and of the same material by employing the seal of the present invention as depicted in FIGS. 2, 4 and 6. A tack seal 26 between the hem portion 18 and the adjacent panel 12 extends across the width of the bag below the draw tape. The groove is in the panel on the outside of the bag, whereas the hem portion 12 is inside the bag. The seal is formed by applying moderate heat between heating means on the outside of the bag and a platen which is adjacent the hem portion 18.

The tack seal 26 includes a continuous line of heat fused polyethylene between hem portion 18 and adjacent panel 12. The heat seal includes a single groove formed solely by application of moderate heat. Only sufficient heat has been applied to melt the adjacent surfaces of hem portion 18 and panel 12. Preferably, the groove formed is less than ⅛ of the thickness of the polyethylene.

The properties of linear low density polyethylene (LLDPE) plastic are particularly attractive for forming such a seal. LLDPE is a copolymer of ethylene and a $C_3$-$C_{10}$ alpha olefin (presently $C_4$-$C_8$ is preferably used.) The alpha olefin is in a minor proportion, about 3–8%. The density is 0.92 to 0.93 gm/cc, depending on the copolymer.

Figure 8:
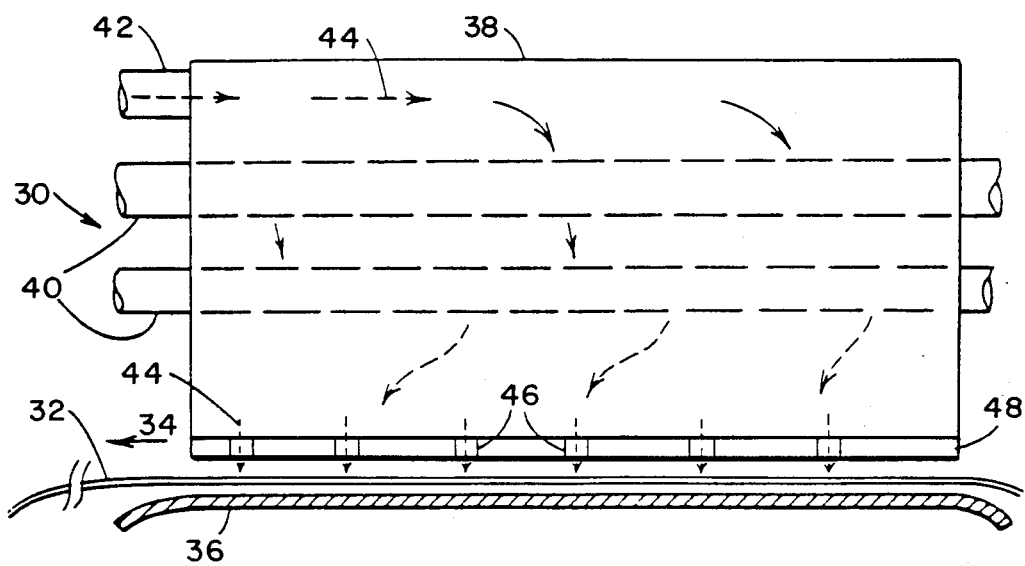
FIGS. 8 through 11 depict one heat sealing technique which can be used to form the seal of the present invention; and more particularly.
Figure 9:
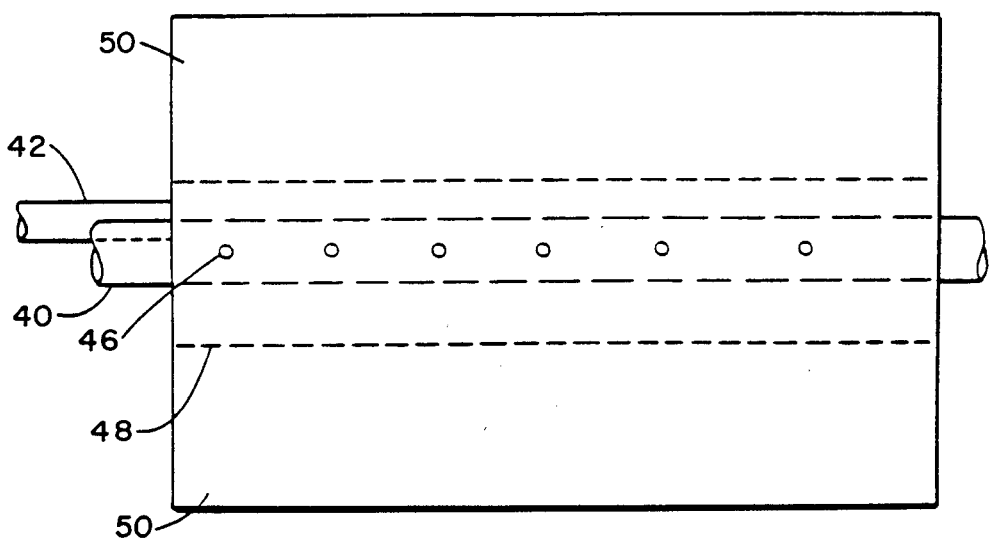

FIG. 8 shows a manifold arrangement 30 positioned above a pair of thermoplastic films 32 moving the direction 34. As the films pass beneath the manifold 30 they ride upon a support plate 36. The manifold 30 illustrated in FIG. 1 is generally a box-like structure 38 having a cross-section of rectangular shape. Through the interior of this structure is a suitable heat exchange system, for example, calrods 40. At the upper end of this structure is an inlet pip 42 for the introduction of a gas, for example, air which passes over the calrods 40 and are heated thereby. Arrows 44 represent the flow of gas through the interior of the manifold and individual streams of air 44 exit through nozzles or orifices 46 which are located in nozzle plate 48. Extending outwardly in opposite directions from each orifice 46 are pressure-equalizing plates 50 showin in FIGS. 9 and 10. These plates, which may be an extension of the nozzle or orifice plate or be separate outrigger extensions attached thereto, function to avoid the adverse effect of of partial vacuum or differences in pressure created by virtue of the exiting stream of heated gas alone or in combination with the air turbulence caused by the transported film. The plates prevent one or more of the films to be thermowelded from becoming position-disturbed. More specifically, without this device the film will not transport past the point of thermoplastic welding without the differences in pressure causing a moving and/or lifting of one or both of the films at this point.

Figure 10:
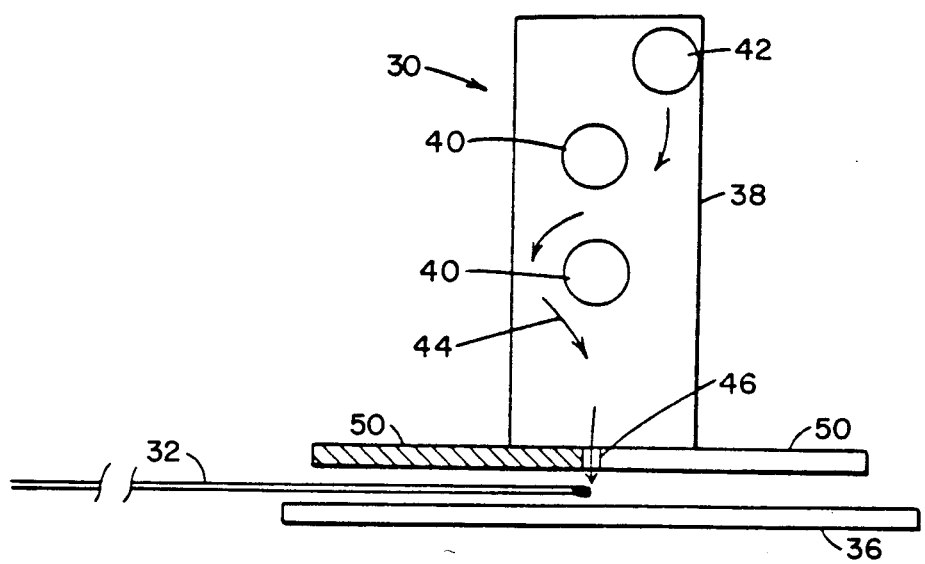

FIG. 10 is a schematic end view of the system of FIG. 8. In this view, the films 32 are passing beneath the orifices 46, and exiting hot gas 44 is performing a hot seal between the two films at the border edge of the films.

Figure 11:
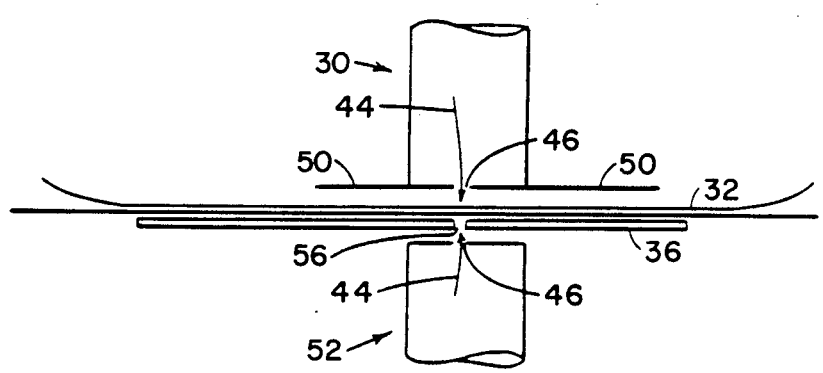

FIG. 11 illustrates a variatin in the system where two or three films can be heat sealed from opposite directions simultaneously. On one side of the combined films, manifold system 30 is basically the same as that illustrated in FIGS. 8–10. However, as the films 32 pass by manifold 30, there is positioned on the opposite side of support plate 36 another manifold system 52. Manifold 52 has all the essential parts of manifold 30 except the pressure-equalizing plate 50 is not necessary since support plate 36 will prevent the transporting films 32 from being disturbed in the direction of manifold 52. Support plate 36 has a slot 56 formed therein to accommodate the hot air streams exiting from manifold 52 through orifices 46 so as to contribute to the heat welding of film combination 32. Linear low density polyethylene has the good strength characteristics (commonly referred to as "toughness") which makes low density polyethylene better suited for trash bags than high density polyethylene. Moreover, linear low density polyethylene has the characteristic of less shrinkage for a given application of heat. In accordance with the present invention, just enough heat is supplied to the seal to melt the two opposing surfaces of polyethylene. This application of heat does not cause noticable shrinkage adjacent the heat seal. Because there is no shrinkage, the shoulders on both sides of the groove 26 are not reoriented. Therefore, the stress is not concentrated in the thinned groove 26, but rather is distributed over a broader area of the bag. When a tear is initiated at the edge of the bag, as indicated in FIG. 7, the tear propagates as a stretching of the polyethylene. Rather than being propagated in a single narrow groove, the tear is distributed to areas on both sides of the groove. This produces a marked improvement in the tearing characteristics of the bag. Preferably, the bag and the draw tapes are made from the same linear low density polyethylene material.

The seal of the present invention is preferably formed by the apparatus disclosed in co-pending application Ser. No. 561,119, filed Dec. 13, 1983, "PROCESS FOR HEAT SEALING THERMOPLASTIC FILM AND APPARATUS THEREFOR", as described hereinafter. The seal of the present invention has also been successfully made by conventional heat sealing bars with a modified operation so that pressure is applied by the heat bar and only moderate heat is applied to the plastic.

FIGS. 8-11 show the apparatus of the aforementioned co-pending application for forming the heat seal of the present invention. FIG. 8 shows a manifold arrangement 30 positioned above a pair of thermoplastic films 32 moving in the direction 34. As the films pass beneath the manifold 30 they ride upon a support plate 36. The manifold 30 illustrated in FIG. 1 is generally a box-like structure 38 having a cross-section of rectangular shape. Through the interior of this structure is a suitable heat exchange system, for example, calrods 40. At the upper end of this structure is an inlet pipe 42 for the introduction of a gas, for example, air which passes over the calrods 40 and are heated thereby. Arrows 44 represent the flow of gas through the interior of the manifold and individual streams of air 44 exit through nozzles or orifices 46 which are located in nozzle plate 48. Extending outwardly in opposite directions from each orifice 46, are pressure-equalizing plates 50 shown in FIGS. 9 and 10. These plates, which may be an extension of the nozzle or orifice plate or be separate outrigger extensions attached thereto, function to avoid the adverse effect of partial vacuum or differences in pressure created by virtue of the exiting stream of heated gas alone or in combination with the air turbulence caused by the transported film. The pressure equalizing plates 50 prevent one or more of the films to be thermowelded from becoming positioned-disturbed. More specifically, without this device the film will not transport past the point of thermoplastic welding without the differences in pressure causing a moving and/or lifting of one or both of the films at this point.

FIG. 10 is a schematic end view of the system of FIG. 8. In this view, the films 32 are passing beneath the orifices 46, and exiting hot gas 44 is performing a heat seal between the two films at the border edge of the films.

FIG. 11 illustrates a variation in the system where two or three films can be heat sealed from opposite directions simultaneoulsy. On one side of the combined films, manifold system 30 is basically the same as that illustrated in FIGS. 8-10. However, as the films 32 pass by manifold 30, there is positioned on the opposite side of support plate 36 another manifold system 52. Manifold 52 has all the essential parts of manifold 30, except the pressure-equalizing plate 50 is not necessary since support plate 36 will prevent the transporting films 32 from being disturbed in the direction of manifold 52. Support plate 36 has a slot 56 formed therein to accommodate the hot air streams exiting from manifold 52 through orifices 46 so as to contribute to the heat welding of film combination 32.

EXAMPLE 1

A heat bar commercially available from the Park Air Company, their Model No.HS-1400, was used to make the heat seals. The heat bar was operated at a temperature of 275°-375° F. The heat bar was brought lightly into contact with the outer panel portion of the polyethylene and remained there for approximately 250 milliseconds. The bag material was 1.4 and 1.1 mil polyethylene (0.036 and 0.028 mm.) made from a blend of 90% linear low density and 10% low density polyethylene. The heat applied was just sufficient to tack together the panel and the hem portion. The resulting application of heat left a groove in the outer panel portion approximately 2 mm wide. The depth of the groove was not measurable with a micrometer accurate to 0.00254 mm. No significant deformation of the material adjacent the groove or of the hem portion was observed. The seal had improved tear characteristics when compared with bags having seals of the type depicted in FIGS. 1 and 3. More particularly, under the same normal use the bags with the controlled seals experienced no catastrophic failures. If a small tear occurred in the film it would not proceed in any particular direction and would quickly terminate even if the loaded bag was rapidly accelerated (jerked) in an upward direction. Closer inspection indicated that there was no thinned region in the controlled seal leading to the conclusion that the orientation noted in the regular seal was not in the controlled seal. Even under severe hand tests the seal area would elongate but would not rupture.

EXAMPLE 2

The apparatus of the aforementioned co-pending application was used to form the heat seal on the same material as in Example 1. Two contacting films of low density polyethylene 1.5 mils (0.038 mm) each in thickness were transported past 20 in-line orifices, 0.76 mm in diameter equally spaced over a distance of 9 inches. The rate of transport of the film was 200 feet per minute. The films were spaced from the orifices a distance of about 3.175 mm. The temperature of the exiting heated air was about 300° F.; the force of the projected air was sufficient to cause a firmer contact between the films. The nozzle plate had a pair of 6.35 mm×15.88 mm pressure equalizing plates extending outboard thereof to effectively prevent separation and lifting of the films at the region of intended heat bonding. The depth of the groove was less than that in Example 1. The resultant seal had a strength greater than the yield strength of the film, and exhibited the same tear characteristics discussed in Example 1.

While a particular embodiment of the invention has been shown and described, various modifications are within the true spirit and scope of the invention. The appended claims are, therefore, intended to cover all such modifications.

What is claimed is:

1. A draw tape bag for carrying trash and the like comprising:

two panels formed from a tube of extruded polyethylene which is oriented in the extruded direction, the sides of said panels being heat sealed and cut from said tube in a perpendicular direction, said tube being slit to form an open top in said bag for reception of trash and the like;

a hem portion of each panel being folded over adjacent said top;

draw tapes in each hem secured at said sides of said panels; and a tack seal between each hem portion and the adjacent panel, said tack seal extending in said extruded direction across the width of said bag below said draw tape, said tack seal including a continuous line of heat fused polyethylene between said hem portion and said adjacent panel including a single groove formed solely by application of moderate heat with negligible re-orientation of said polyethylene in said perpendicular direction on both sides of said groove, the depth of said groove being less than ⅛ the thickness of said panel.

2. The bag recited in claim 1 wherein said polyethylene is 70-100% linear low density polyethylene.

3. The bag recited in claim 2 wherein said polyethylene is about 90% linear low density polyethylene.

4. The bag recited in claim 1 wherein said bag and draw tapes are made from the same polyethylene material.

5. The bag recited in claim 1 wherein said hem portion is inside said bag and said groove is in the panel on the outside of the bag.

6. The bag recited in claim 1 wherein said draw tape is exposed by a cut out in each panel and hem portion at the middle of said bag.

7. The bag recited in claim 1 wherein said draw tape is secured at the sides of said panels by the heat seal at the sides of said panels.

8. The bag recited in claim 1 wherein said panels are formed from 1.1-1.4 mil thick polyethylene and said groove is less than 0.0000 mils deep.

* * * * *